United States Patent
Zhang et al.

(10) Patent No.: US 11,984,590 B2
(45) Date of Patent: May 14, 2024

(54) POSITIVE ELECTRODE MATERIAL FOR LITHIUM ION BATTERY AND PREPARATION METHOD THEREFOR

(71) Applicant: Beijing Easpring Material Technology Co., Ltd., Beijing (CN)

(72) Inventors: Hang Zhang, Beijing (CN); Yafei Liu, Beijing (CN); Jingpeng Wang, Beijing (CN); Xuequan Zhang, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/235,084

(22) Filed: Aug. 17, 2023

(65) Prior Publication Data
US 2023/0395793 A1    Dec. 7, 2023

Related U.S. Application Data

(63) Continuation of application No. PCT/CN2022/092274, filed on May 11, 2022.

(30) Foreign Application Priority Data

Apr. 29, 2022   (CN) .......................... 202210478509.1

(51) Int. Cl.
*H01M 4/505* (2010.01)
*C01G 53/00* (2006.01)
*H01M 4/525* (2010.01)
*H01M 4/02* (2006.01)

(52) U.S. Cl.
CPC ............ *H01M 4/505* (2013.01); *C01G 53/50* (2013.01); *H01M 4/525* (2013.01); *C01P 2002/54* (2013.01); *C01P 2002/72* (2013.01); *C01P 2004/03* (2013.01); *C01P 2004/61* (2013.01); *C01P 2004/62* (2013.01); *C01P 2006/11* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 2014/0162119 A1 | 6/2014 | Takei et al. |
| 2016/0372749 A1 | 12/2016 | Iida et al. |
| 2017/0237069 A1 | 8/2017 | Takamori et al. |
| 2021/0159496 A1 | 5/2021 | Mitsumoto et al. |
| 2021/0320354 A1 | 10/2021 | Zhu et al. |

FOREIGN PATENT DOCUMENTS

| | | |
|---|---|---|
| CN | 103872311 A | 6/2014 |
| CN | 105378987 A | 3/2016 |
| CN | 107078293 A | 8/2017 |
| CN | 111033830 A | 4/2020 |
| CN | 112424984 A | 2/2021 |
| JP | 2010047466 A | 3/2010 |

OTHER PUBLICATIONS

English translation of International Search Report dated Dec. 16, 2022 for corresponding International Application No. PCT/CN2022/092274.
English machine translation of JP 2010047466.

*Primary Examiner* — Carlos Barcena
(74) *Attorney, Agent, or Firm* — Saul Ewing LLP; Sean P. Ritchie (57) ABSTRACT

Provided is a positive electrode material for a lithium ion battery, having the following general formula I: $Li_{1+a}Ni_xCo_yMn_zM_cM'_dO_{2-b}A_b$ general formula I, wherein $-0.05 \leq a \leq 0.3$, $0.8 \leq x \leq 1$, $0 \leq y \leq 0.2$, $0 \leq z \leq 0.2$, $0 \leq c \leq 0.01$, $0 \leq d \leq 0.01$, $x+y+z+c+d=1$, and $0 \leq b \leq 0.05$; M and M' are different from each other and each independently selected from at least one of La, Cr, Mo, Ca, Fe, Ti, Zn, Y, Zr, W, Nb, V, Mg, B, Al, Sr, Ba and Ta, A is selected from at least one of F, Cl, Br, I and S, and the number of crystallite boundaries N in primary particles of the positive electrode material is from 10.5 to 14.5, wherein N is calculated according to Equation I: $N=D_S/D_X$ Equation I, wherein $D_S$ is an average size of the primary particles, as measured from scanning electron microscope (SEM) image of cross section of the positive electrode material, and $D_X$ is an average size of crystallites in the primary particles of the positive electrode material, as measured by an XRD test and calculated by the Scherrer equation. Also provided is a method for preparing the positive electrode material.

11 Claims, 2 Drawing Sheets

POSITIVE ELECTRODE MATERIAL FOR LITHIUM ION BATTERY AND PREPARATION METHOD THEREFOR

CROSS-REFERENCE TO RELATED APPLICATIONS

The present application is a continuation bypass of, and claims priority to, International Application No. PCT/CN2022/092274, filed May 11, 2022, which claims priority to Chinese Patent Application No. 202210478509.1 filed Apr. 29, 2022.

TECHNICAL FIELD

The invention relates to a positive electrode material for a lithium ion battery, and preparation method thereof.

BACKGROUND ART

With the global prevalence of "carbon peaking" and "carbon neutrality", new energy vehicles, as well as energy saving and emission reduction, have become critical tasks for the automobile industry, pushing traditional internal combustion engine vehicles to transform to new energy electric vehicles which are more green and environmental-friendly. In electric vehicles, lithium ion batteries attract wide attention as a promising, efficient and environmental-friendly power source.

At present, layered ternary materials are one of the dominant choices for positive electrode materials of lithium ion batteries. As compared with components such as a negative electrode and an electrolyte, a positive electrode material has a low capacity, a high proportion and a high cost, which constitutes a key factor that limits the overall performance of a lithium ion battery.

The properties of the layered ternary materials, such as a capacity, a rate, and a life span, can be improved by such means as adjusting a particle size, adjusting a structural morphology, doping, and coating modification of the materials. In patent application CN111106344A, aluminum-magnesium phosphate composite is used as a raw material to coat the surface of the positive electrode material through solid-phase, liquid-phase, and gas-phase methods. After thermal treatment, a composite positive electrode material is obtained which sequentially comprises positive electrode material-doped layer-coating layer from inside to outside. During a re-sintering process, a small amount of lithium ions enter the coating layer to improve the ionic conductivity of the coating layer; meanwhile, a portion of metal in the coating layer enters the surface of the positive electrode so as to stabilize the structure of the material; thereby obtaining a high-capacity positive electrode material with better comprehensive performance. In patent application CN111217407A, a precursor and a lithium-containing compound are separately pre-sintered, and then mixed and sintered. The crystallinity of the material is improved, the residual alkali content on the surface of the material is reduced, and the occurrence of side reactions on the surface is prevented, and thus the capacity and the cycle stability of the positive electrode material is enhanced.

In order to meet the increasing requirements, such as endurance mileage and quick charge, it is still desirable to continuously improve the rate performance, the capacity, the cycle life and the like of lithium ion batteries, wherein improvement of performances of layered ternary materials is critical.

SUMMARY OF INVENTION

In this regard, on the one hand, the present disclosure provides a positive electrode material for a lithium ion battery, having the following general formula I:

$$Li_{1+a}Ni_xCo_yMn_zM_cM'_dO_{2-b}A_b \qquad \text{general formula I,}$$

wherein $-0.05 \leq a \leq 0.3$, $0.8 \leq x \leq 1$, $0 \leq y \leq 0.2$, $0 \leq z \leq 0.2$, $0 \leq c \leq 0.01$, $0 \leq d \leq 0.01$, $x+y+z+c+d=1$, and $0 \leq b \leq 0.05$;

M and M' are different from each other and each independently selected from at least one of La, Cr, Mo, Ca, Fe, Ti, Zn, Y, Zr, W, Nb, V, Mg, B, Al, Sr, Ba and Ta, A is selected from at least one of F, Cl, Br, I and S, and the number of crystallite boundaries N in primary particles of the positive electrode material is from about 10.5 to about 14.5, wherein N is calculated according to Equation I:

$$N=D_S/D_X \qquad \text{Equation I,}$$

wherein $D_S$ is an average size of the primary particles, as measured from scanning electron microscope (SEM) image of cross section of the positive electrode material, and $D_X$ is an average size of crystallites in the primary particles of the positive electrode material, as measured by an XRD test and calculated by the Scherrer equation.

According to the present invention, by including a controllable specific number of crystallite boundaries in the primary particles of the positive electrode material, a path for rapid diffusion of lithium ions in the bulk phase is provided, which increases the diffusion coefficient of lithium ions, so as to achieve excellent rate performance and capacity development. At the same time, it also balances the crystallinity of the primary particles, and avoids microcracks occurrence inside the particles, especially inside the primary particles, during the charge/discharge cycle of the battery, thereby improving the cycle life of the positive electrode material and the lithium ion battery.

On the other hand, the present invention also provides a method for preparing the positive electrode material according to the present invention, comprising the steps of:

Step i)-1 mixing a first aqueous solution comprising a nickel salt, a cobalt salt and a manganese salt, a second aqueous solution comprising a sodium-containing alkaline compound and/or a potassium-containing alkaline compound, and aqueous ammonia, and adjusting a first pH value of the resultant mixed aqueous solution to from about 9 to about 12, so as to allow a co-precipitation reaction to occur to form crystals;

Step i)-2 when the crystals grow to a median diameter $D_{50}$ of from about 2 to about 5 μm, adjusting a second pH value of the mixed aqueous solution to from about 9 to about 12, wherein the second pH value is greater than the first pH value and the difference therebetween is from about 0.1 to about 1.0, and allowing the crystals to continue to grow to a median diameter $D_{50}$ of from about 9 to about 20 μm, thereby obtaining a precursor;

Step ii) mixing the precursor, a lithium source and a first additive comprising element M, sintering the resultant mixture at a constant temperature of from about 650 to about 900° C. for from about 4 to about 20 hours, subjecting the sintered mixture to naturally cooling to room temperature, and crushing, sieving, and iron-removal, thereby obtaining a first positive electrode material $Li_{1+a}Ni_xCo_yMn_zM_cO_2$, and optionally Step iii) mixing the first positive electrode material $Li_{1+a}Ni_xCo_yMn_zM_cO_2$ and a second additive comprising element M' and/or A, sintering the resultant mixture at a constant temperature of from about 200 to about 700° C. for from about 3 to about 10 hours, thereby obtaining a second positive electrode material $Li_{1+a}Ni_xCo_yMn_zM_cM'_dO_{2-b}A_b$.

The preparation method according to the present invention is controllable, simple, and easy to operate. By controlling the nucleation process of the precursor and the pH value during the growth of the crystal, the primary fiber morphology and crystallinity of the precursor are controlled in a simple manner, which in turn controls the number of crystallite boundaries in the primary particles of the positive electrode material. Moreover, the control of the crystallinity and the number of crystallite boundaries of the positive electrode material are realized by selecting the types of and controlling the amounts of the doping elements that have the function of regulating the growth of crystallite boundaries, in combined with the regulation of the sintering temperature.

Lithium ion batteries comprising the positive electrode material according to the present invention can be used in electric vehicles (such as automobiles), regional power stations and portable devices.

Various other features, aspects and advantages of the present invention will become more apparent with reference to the following accompanying drawings. These drawings are not drawn to scale, but intended to schematically explain various structures and position relationships, and should not be construed as limiting.

DETAILED EMBODIMENTS

Unless defined otherwise, all the technical and scientific terms used herein have the meaning as commonly understood by those skilled in the art to which the present invention pertains. If there is any inconsistency, the definitions provided in the present application shall be dominant.

Unless otherwise indicated, the numerical ranges stated herein are intended to include the endpoints of the ranges, and all numbers and all subranges within the ranges.

The materials, contents, processes, devices, figures and examples herein are all illustrative and should not be construed as limiting unless otherwise specified.

The terms "comprising", "including" and "having" used herein all indicate that other components or other steps that do not affect the final effect may be included. These terms encompass the meanings of "consisting of" and "consisting essentially of". Products and processes according to the present invention may contain or comprise the essential technical features described in the present disclosure, as well as additional and/or optional components, ingredients, steps or other limiting features described herein; or may be consisting of the essential technical features described in the present application, as well as additional and/or optional components, ingredients, steps or other limiting features described herein; or may be essentially consisting of the essential technical features described in the present application, as well as additional and/or optional components, ingredients, steps or other limiting features described herein.

All materials and reagents used in the present disclosure are commercially available unless expressly stated otherwise.

Operations herein may be performed at room temperature and atmospheric pressure, unless otherwise indicated or obviously contradictory.

The method steps in the present disclosure can be performed in any suitable order, unless otherwise indicated or obviously contradictory.

As used herein, the term "about" means that the numerical value it modifies may have a deviation within the range of ±10% of the numerical value. For example, the term "about 300 nm" refers to the range of "300±30 nm".

Examples of the present disclosure will be described in detail below.

[Positive Electrode Material]

According to the present disclosure, there is provided a positive electrode material for a lithium ion battery, having the following general formula I:

$$Li_{1+a}Ni_xCo_yMn_zM_cM'_dO_{2-b}A_b \qquad \text{general formula I,}$$

wherein $-0.05 \leq a \leq 0.3$, $0.8 \leq x \leq 1$, $0 \leq y \leq 0.2$, $0 \leq z \leq 0.2$, $0 \leq c \leq 0.01$, $0 \leq d \leq 0.01$, $x+y+z+c+d=1$, and $0 \leq b \leq 0.05$;

M and M' are different from each other and each independently selected from at least one of La, Cr, Mo, Ca, Fe, Ti, Zn, Y, Zr, W, Nb, V, Mg, B, Al, Sr, Ba and Ta, A is selected from at least one of F, Cl, Br, I and S, and the number of crystallite boundaries N in primary particles of the positive electrode material is from about 10.5 to about 14.5, wherein N is calculated according to Equation I:

$$N = D_S/D_X \qquad \text{Equation I,}$$

wherein $D_S$ is an average size of the primary particles, as measured from scanning electron microscope (SEM) image of cross section of the positive electrode material, and $D_X$ is an average size of crystallites in the primary particles of the positive electrode material, as measured by an XRD test and calculated by the Scherrer equation.

In some embodiments, when d and b in general formula I are 0, the positive electrode material has the following general formula II:

$$Li_{1+a}Ni_xCo_yMn_zM_cO_2 \qquad \text{general formula II,}$$

wherein a, x, y, z, c, M, M' and A are as defined above for general formula I.

Both the capacity development and the rate performance of layered ternary materials are limited by the diffusion ability of lithium ions. In addition to an interlayer diffusion of lithium ions and an exchange process at the solid-liquid interface, the diffusion of lithium ions at defect sites such as crystallite boundaries is often neglected. A certain number of crystallites are retained inside the primary particles of the positive electrode material according to the present invention, and form crystallite boundaries among the crystallites. A certain number of crystallite boundaries facilitate the improvement of diffusion rate of lithium ions in bulk phase, thereby improving the capacity and the rate performance of the positive electrode material. Meanwhile, good crystallinity is maintained, which avoids the risk of breakage of primary particles during repeated charge/discharge, thereby ensuring the cycle life of the positive electrode material.

The positive electrode material has structural characteristics of secondary particles as agglomerated by primary particles, wherein the primary particle refers to a relatively intact individual particle that has a distinct boundary from the surrounding positive electrode material, and the secondary particle refers to a large sphere of the positive electrode material which is formed by accumulation of multiple said primary particles and will not separate without external force. The inside of the primary particles of the positive electrode material is not a perfect single crystal structure, but is composed of a plurality of microcrystalline domains with a short-range ordered crystal structure tightly bound together. The boundaries which define the intercombination of microcrystalline domains are crystallite boundaries, which cannot be clearly identified by external observation means such as SEM.

The number of crystallite boundaries N is calculated according to Equation 1:

$$N=D_S/D_X \quad \text{Equation I.}$$

In some embodiments, $D_S$ is from about 300 to about 600 nm, preferably from about 400 to about 550 nm, and more preferably from about 450 to about 550 nm, and $D_S$ is measured from scanning electron microscope (SEM) image of cross section of the positive electrode material.

In some embodiments, $D_X$ is from about 30 to about 60 nm, preferably from about 40 to about 50 nm, and more preferably from about 40 to about 45 nm, and $D_X$ is calculated according to Equation II:

$$D_X=(D_{(003)}+D_{(104)})/2 \quad \text{Equation II,}$$

wherein $D_{(003)}$ represents a crystal thickness in a direction normal to (003) crystal plane which is represented by a single (003) peak, $D_{(104)}$ represents a crystal thickness in a direction normal to (104) crystal plane which is represented by a single (104) peak, and $D_{(003)}$ and $D_{(104)}$ are each calculated according to the Scherrer Equation:

$$D=K\lambda/(\beta \cdot \cos \theta) \quad \text{Scherrer Equation,}$$

wherein,
K is the Scherrer constant of 0.89,
$\lambda$ is a wavelength of the X-ray and equals to 1.54056 Å.
$\beta$ is a full width at half maximum of the diffraction peak $D_{(003)}$ or $D_{(104)}$ in the XRD pattern, and
$\theta$ is a Bragg diffraction angle of the diffraction peak $D_{(003)}$ or $D_{(104)}$ in the XRD pattern, $2\theta$ of the (003) peak is in the range of from about 18.5 to about 19.5°, and $2\theta$ of the (104) peak is in the range of from about 44.0 to about 45.0°.

In some embodiments, the median diameter $D_{50}$ of the secondary particles of the positive electrode material is from about 9 to about 20 μm, and $D_{50}$ is measured by a laser particle sizer and calculated based on volume distribution.

The median diameter $D_{50}$ refers to the value of the particle size where the volume distribution percentage of the particles reaches 50%. For example, if the median diameter $D_{50}$ of the secondary particles is 9 μm, it means that 50% by volume of the second particles are larger than 9 μm, and 50% by volume are smaller than 9 μm.

In some embodiments, the ratio of a compacted density PD measured at 20 KN to a tap density TD of the positive electrode material satisfies 1.1≤PD/TD≤1.3. A PD/TD ratio within such range makes the positive electrode material sufficiently dense, which facilitates the processing to obtain electrode sheets for lithium ion batteries with high compacted density, increases volumetric energy density, and has suitable porosity so as to facilitate the electrolyte to wet the positive electrode material, thereby imparting the lithium ion batteries with excellent capacity and rate performance.

In some embodiments, the angle of repose α of the positive electrode material is ≤50°, preferably from about 30° to about 45°. The angle of repose α is measured according to GB/T 6609.24-2004 for measuring the angle of repose of alumina powder. The angle of repose α within said ranges imparts the positive electrode material with good fluidity, which is beneficial to the processability in practical production.

[Method for Preparing Positive Electrode Material]

The present invention also provides a method for preparing a positive electrode material for a lithium ion battery, comprising the steps of:

Step i)-1 mixing a first aqueous solution comprising a nickel salt, a cobalt salt and a manganese salt, a second aqueous solution comprising a sodium-containing alkaline compound and/or a potassium-containing alkaline compound, and aqueous ammonia, and adjusting a first pH value of the resultant mixed aqueous solution to from about 9 to about 12, so as to allow a co-precipitation reaction to occur to form crystals;

Step i)-2 when the crystals grow to a median diameter $D_{50}$ of from about 2 to about 5 μm, adjusting a second pH value of the mixed aqueous solution to from about 9 to about 12, wherein the second pH value is greater than the first pH value and the difference therebetween is from about 0.1 to about 1.0, and allowing the crystals to continue to grow to a median diameter $D_{50}$ of from about 9 to about 20 μm, thereby obtaining a precursor;

Step ii) mixing the precursor, a lithium source and an additive comprising element M, sintering the resultant mixture at a constant temperature of from about 650 to about 900° C. for from about 4 to about 20 hours, subjecting the sintered mixture to naturally cooling (preferably cooling to room temperature), and crushing, sieving, and iron-removal, thereby obtaining a first positive electrode material $Li_{1+a}Ni_xCo_yMn_zM_cO_2$, and optionally Step iii) mixing the first positive electrode material $Li_{1+a}Ni_xCo_yMn_zM_cO_2$ and a second additive comprising element M' and/or A, sintering the resultant mixture at a constant temperature of from about 200 to about 700° C. for from about 3 to about 10 hours, thereby obtaining a second positive electrode material $Li_{1+a}Ni_xCo_yMn_zM_cM'_dO_{2-b}A_b$.

As described above, the preparation method according to the present invention is controllable, simple, and easy to operate. By co-regulation of the alkaline compound containing sodium or potassium, and the aqueous ammonia, the nucleation process of the precursor and the pH value during the growth of the crystal are controlled, so as to control the primary fiber morphology and crystallinity of the precursor, and further control the number of crystallite boundaries in the primary particles of the positive electrode material. Moreover, the control of the crystallinity and the number of crystallite boundaries of the positive electrode material are realized by selecting the types of and controlling the amounts of the doping elements that have the function of regulating the growth of crystallite boundaries, in combined with the regulation of the sintering temperature.

In some embodiments, the first pH value is from about 10.5 to about 11.2, and the second pH value is from about 11.2 to about 11.8.

In some embodiments, in Step i)-1, the nickel salt, the cobalt salt and the manganese salt are each independently selected from the group consisting of sulfates, nitrates, acetates, and combination thereof, preferably, the nickel salt, the cobalt salt and the manganese salt are all sulfates, or are all nitrates, or are all acetates.

In some embodiments, in Step i)-1, the nickel salt, the cobalt salt and the manganese salt are mixed at the molar ratio of nickel to cobalt to manganese according to the formula of the first positive electrode material $Li_{1+a}Ni_xCo_yMn_zM_cO_{2-b}$.

In some embodiments, in Step i)-1, the concentration of the first aqueous solution is 1-3 mol/L, the concentration of the second aqueous solution as a precipitating agent is 2-12 mol/L, and the concentration of the aqueous ammonia as a complexing agent is 2-10 mol/L.

In some embodiments, in Step i)-1, the sodium-containing alkaline compound and/or the potassium-containing alkaline compound are each independently selected from the group consisting of hydroxides, carbonates, bicarbonates, oxalates of sodium or of potassium, and combination thereof.

In some embodiments, in Step i)-1, the co-precipitation reaction is performed in the presence of an inert gas. In some embodiments, the inert gas is nitrogen.

In some embodiments, in Step i)-1, the reaction system temperature of the co-precipitation reaction is constant, and preferably is 50-80° C.

In some embodiments, in Step i)-1, the reaction time of the co-precipitation reaction is 40-100 hours.

In some embodiments, in Step i)-1, the co-precipitation reaction is performed under stirring.

In some embodiments, in Step i)-2, the crystal growth is performed under stirring.

In some embodiments, in Step i)-2, after the co-precipitation reaction is completed, one or more operations selected from the group consisting of aging, separation, washing and drying are performed, thereby obtaining the precursor.

In some embodiments, in Step ii), the lithium source is selected from the group consisting of lithium carbonate, lithium hydroxide and combination thereof, preferably lithium hydroxide.

In some embodiments, in Step ii), the first additive comprising element M is selected from the group consisting of oxides, hydroxides, halides, sulfides, phosphates, borates of element M, and combination thereof, preferably tungsten trioxide, molybdenum trioxide, diniobium pentaoxide, dilanthanum trioxide and ditantalum pentoxide, or the combinations thereof.

In some embodiments, in Step ii), the precursor, the lithium source and the first additive comprising element M are uniformly mixed in a high-speed blender.

In some embodiments, in Step ii), the sintering is performed at a constant temperature in an oxygen furnace.

In some embodiments, in Step ii), after cooling the sintered mixture to room temperature, the mixture is subjected to crushing, sieving, and iron removal, thereby obtaining the positive electrode material $Li_{1+a}Ni_xCo_yMn_zM_cO_2$.

In some embodiments, in Step iii), the second additive comprising element M' and/or A is selected from the group consisting of oxides, hydroxides, halides, sulfides, phosphates, borates of element M' and/or A, and combination thereof, preferably alumina and/or lithium fluoride.

In some embodiments, in Step iii), the first positive electrode material $Li_{1+a}Ni_xCo_yMn_zM_cO_2$ and the second additive comprising element M' and/or A are uniformly mixed in a high-speed blender.

In some embodiments, the second additive comprising element M' and/or A may be a mixture of a compound comprising element M' and a compound comprising element A, or may be a compound comprising both of elements M' and A.

In some embodiments, in Step iii), the sintering is performed at a constant temperature in an oxygen furnace.

In some embodiments, in Step iii), the way for coating the material includes dry coating, coating after washing with water and drying, wet in-situ coating, and the like.

EXAMPLES

Example 1

Nickel sulfate, cobalt sulfate and manganese sulfate were dissolved in pure water at a molar ratio of 83:11:6 to obtain a first aqueous solution at a concentration of 2 mol/L. A sodium hydroxide solution at a concentration of 8 mol/L was formulated as a second aqueous solution used as a precipitating agent. An aqueous ammonia at a concentration of 6 mol/L was formulated as a complexing agent solution.

A mixed aqueous solution of the sodium hydroxide solution and the aqueous ammonia was charged into a reactor. The pH was adjusted to 10.9. $N_2$ was purged for protection. The temperature of the reaction system was controlled at 60° C. The first aqueous solution, the sodium hydroxide solution and the aqueous ammonia were separately introduced into the reactor via liquid supply pipes. The rotation speed of stirring was maintained at 500 rpm. The liquid supply rate of the first aqueous solution was controlled at 200 mL/h. The flow rates of the sodium hydroxide solution and the aqueous ammonia were adjusted so as to maintain the pH of the reaction system at 10.9±0.05.

After the particle size $D_{50}$ of the core particles in the reaction system grew to 3.0 μm, the pH of the solution was adjusted to 11.2±0.05, the flow rate of the first aqueous solution was adjusted to 500 mL/h, the rotation speed of the stirring was increased to 700 rpm, and the reaction temperature was kept unchanged. After the average particle size $D_{50}$ of the particles in the solution grew to 14 μm, the solution was aged for 1 hour, separated, washed and dried to obtain the precursor material $Ni_{0.83}Co_{0.11}Mn_{0.06}(OH)_2$.

The above precursor, lithium hydroxide, and tungsten trioxide were separately weighed at a molar ratio of 1:1.03:0.002, mixed uniformly in a blender, and sintered at a constant temperature in an oxygen furnace, with an oxygen concentration greater than 95%. The rate of temperature elevation was 5° C./min. The sintering temperature was 800° C., and the sintering time was 12 hours. After naturally cooling to room temperature, the reaction mixture was subjected to crushing, sieving, and iron removal, thereby obtaining the positive electrode material 1: $Li_{1.03}Ni_{0.828}Co_{0.110}Mn_{0.060}W_{0.002}O_2$.

Figure 1:
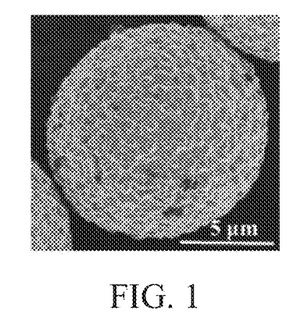
FIG. 1 is a scanning electron microscope (SEM) image of the positive electrode material prepared in Example 1.

FIG. 1 is an SEM image of the positive electrode material prepared in Example 1.

Examples 2-5 and Comparative Examples 1-6

Positive electrode materials were prepared according to the method of Example 1. The material compositions and specific process conditions varied as shown in Table 1, so as to perform Examples 2-5 and Comparative Examples 1-6, respectively, to prepare positive electrode material 2 to positive electrode material 5, and positive electrode material D1 to positive electrode material D6.

In Example 2, the first additive was diniobium pentoxide.
In Example 3, the first additive was molybdenum trioxide.
In Example 4, the first additive was dilanthanum trioxide, and the second additive was aluminum oxide.
In Example 5, the first additive was ditantalum pentoxide, and the second additive was lithium fluoride.

funnel (inner diameter of the discharge port: 3 mm); a glass base plate (its surface having been wiped clean and the plate being disposed horizontally below the funnel); a holder for fixing the funnel (the funnel being rigid in structure, and the center line of the funnel being perpendicular to the horizontal plane); a height positioner (to determine the height from

TABLE 1

Table of Modification of Process Parameters of Preparation Method

| Example No. | Step i) precursor co-precipitation | | | Step ii) blending feed and sintering | | | | Step iii) second sintering | | | |
|---|---|---|---|---|---|---|---|---|---|---|---|
| | Molar Ratio of Ni:Co:Mn | Step i)-1 First pH | Step i)-2 Second pH | M in the First Additive | Molar Equivalent of M | Sintering Temperature (° C.) | Sintering Time (h) | M in the Second Additive | Molar Equivalent of M | Sintering Temperature (° C.) | Sintering Time (h) |
| Example 1 | 83:11:06 | 10.9 | 11.2 | W | 0.002 | 800 | 12 | / | / | / | / |
| Example 2 | 80:10:10 | 11 | 11.5 | Nb | 0.002 | 840 | 12 | / | / | / | / |
| Example 3 | 86:09:05 | 10.9 | 11.2 | Mo | 0.002 | 800 | 12 | / | / | / | / |
| Example 4 | 90:05:05 | 10.8 | 11.2 | La | 0.002 | 780 | 12 | Al | 1:0.003 | 400 | 10 |
| Example 5 | 93:04:03 | 10.8 | 11.4 | Ta | 0.002 | 750 | 12 | F | 1:0.003 | 600 | 10 |
| Comparative Example 1 | 83:11:06 | 10.9 | 11.2 | W | 0.02 | 800 | 12 | / | / | / | / |
| Comparative Example 2 | 83:11:06 | 10.9 | 11.2 | / | / | 800 | 12 | / | / | / | / |
| Comparative Example 3 | 83:11:06 | 10.9 | 12.1 | W | 0.002 | 800 | 12 | / | / | / | / |
| Comparative Example 4 | 83:11:06 | 10.9 | 10.2 | W | 0.002 | 800 | 12 | / | / | / | / |
| Comparative Example 5 | 83:11:06 | 10.9 | 11.2 | W | 0.002 | 600 | 12 | / | / | / | / |
| Comparative Example 6 | 83:11:06 | 10.9 | 11.2 | W | 0.002 | 950 | 12 | / | / | / | / |

[Performance Test of Positive Electrode Material]

The following tests were performed on the positive electrode materials prepared in Examples 1-5 and Comparative Examples 1-6, and the test results were recorded in Table 2.

Figure 2:
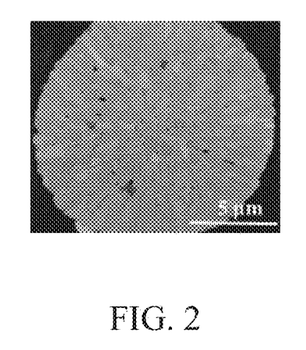
FIG. 2 is a SEM image of cross-section of the positive electrode material prepared in Example 1.

$D_S$ is measured from the scanning electron microscope (SEM) image of the cross section of the positive electrode material. FIG. 2 is an SEM image of the cross section of the positive electrode material prepared in Example 1.

$D_X$ is calculated according to Equation II:

$$D_X = (D_{(003)} + D_{(104)})/2 \quad \text{Equation II,}$$

wherein $D_{(003)}$, represents a crystal thickness in a direction normal to (003) crystal plane which is represented by a single (003) peak, $D_{(104)}$ represents a crystal thickness in a direction normal to (104) crystal plane which is represented by a single (104) peak, and $D_{(003)}$ and $D_{(104)}$ are each calculated according to the Scherrer Equation:

$$D = K\lambda/(\beta \cdot \cos\theta) \quad \text{Scherrer Equation,}$$

wherein,

K is the Scherrer constant of 0.89,
$\lambda$ is a wavelength of the X-ray and equals to 1.54056 Å,
$\beta$ is a full width at half maximum of the diffraction peak $D_{(003)}$ or $D_{(104)}$ in the XRD pattern, and
$\theta$ is a Bragg diffraction angle of the diffraction peak $D_{(003)}$ or $D_{(104)}$ in the XRD pattern, $2\theta$ of the (003) peak is in the range of from about 18.5 to about 19.5°, and $2\theta$ of the (104) peak is in the range of from about 44.0 to about 45.0°.

Figure 3:
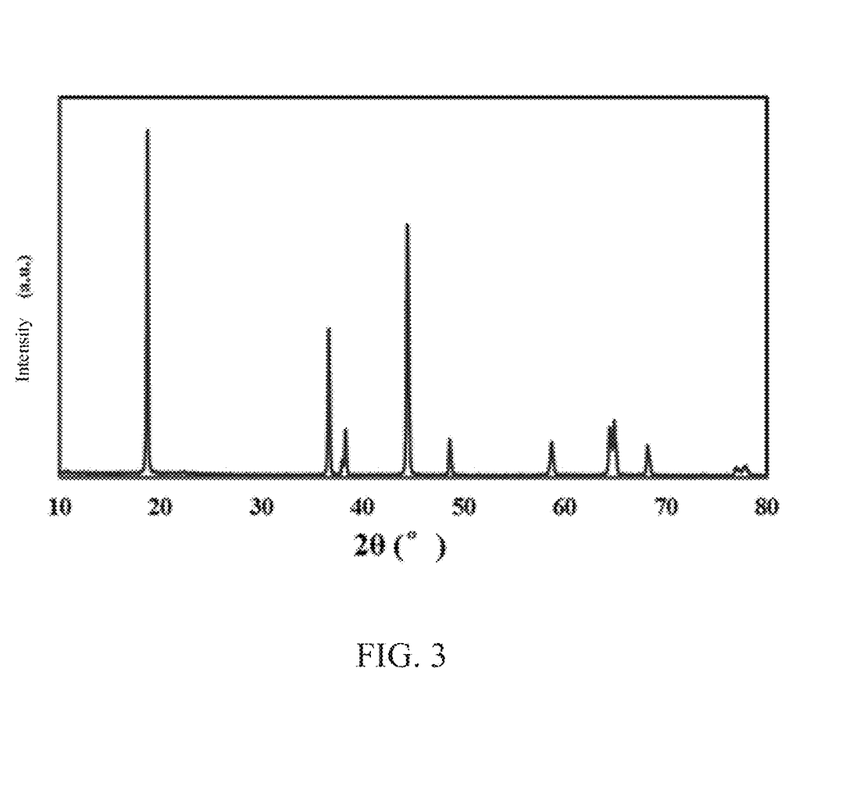
FIG. 3 is an XRD test pattern of the positive electrode material prepared in Example 1.

FIG. 3 is the XRD pattern of the positive electrode material prepared in Example 1.

The median diameter $D_{50}$ is measured by a laser particle sizer and calculated based on volume distribution.

Figure 4:
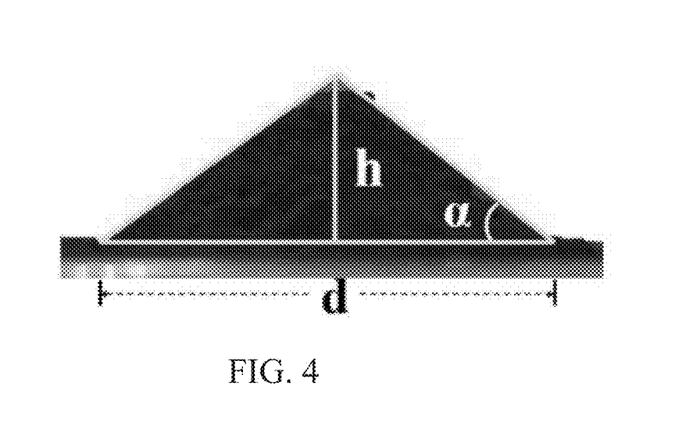
FIG. 4 is a schematic diagram of the method for calculating the angle of repose.

The angle of repose is measured according to GB/T 6609.24-2004 for measuring the angle of repose of alumina powder. The device for the measurement includes: a glass the discharge port of the funnel to the surface of the glass base plate, the height being 60 mm herein). During the test, 15 g of positive electrode material is weighed and fed into the glass funnel at a constant speed. The feed speed is controlled so as to avoid the powder material from blocking the discharge port. After the discharge is completed, the diameter d of the base circle and the height h of the cone formed by the powder are measured. According to the inverse trigonometric function $\alpha = \arctan(2h/d)$, the angle of repose $\alpha$ of the powder material is obtained, as shown in FIG. 4.

[Preparation of Coin Cell]

The positive electrode materials prepared in Examples 1-5 and Comparative Examples 1-6, conductive carbon black and polyvinylidene fluoride (PVDF) were separately weighed and mixed at a mass ratio of 95%:2.5%:2.5%. N-methylpyrrolidone (NMP) was added thereto and the mixture was stirred to form a uniform slurry. The slurry was coated on an aluminum foil, scraped, and dried before being rolled flatly. The resultant material was punched into a positive electrode sheet with a diameter of 12 mm and a thickness of 120 μm under a pressure of 100 MPa, and then dried in a vacuum oven at 120° C. for 12 h.

The process for assembling a coin cell was performed in an Ar-protected glove box, wherein the water content and the oxygen content were both less than 5 ppm. The electrode sheet obtained above was used as a positive electrode, a Li metal sheet with a diameter of 17 mm and a thickness of 1 mm was used as a negative electrode, a polyethylene porous membrane with a thickness of 25 μm was used as a separator; a mixed solution of ethylene carbonate (EC) and diethyl carbonate (DEC) in a volume ratio of 1:1, with 1 mol/L LiPF$_6$ dissolved therein, was used as an electrolyte solution, and a coin cell shell of Model 2025 was used as the cell shell. After assembling, an unactivated half-cell was obtained.

[Performance Evaluation of the Coin Cell]

After the coin cell was assembled, the cell was left to stand for 2 hours. After the open circuit voltage was stable, the cell was charged at a constant current of 0.1 C (1 C=200 mA/g) to a cut-off voltage of 4.3 V, then charged for 30 mins at constant voltage, then discharged at a constant current of 0.1 C to a cut-off voltage of 3.0 V. The charged/discharged cycle was repeated once in the same way, at which point the cell was an activated cell.

Test Method for Measuring Rate Performance: a charge/discharge test was performed on the above activated cell at room temperature, at a voltage ranging from 3.0 to 4.3 V, and at a current density of 0.1 C, 0.2 C, 0.33 C, 0.5 C, 1 C and 2 C respectively. A rate performance was evaluated by the retention rate of the capacity values at different rates, relative to the capacity at the rate of 0.1 C. The results were shown in Table 3.

Cycling Performance Test Method: the activated cell was cycled for 80 times at high temperature (50° C.), at a current density of 1 C, and at a voltage ranging from 3.0 to 4.3 V. The cycling performance was evaluated by capacity retention rate. The results were shown in the Table 3.

[Lithium Ion Diffusion Coefficient Test]

In order to illustrate the reasons why the performances of the characteristic materials of the present invention are improved, a test for lithium ion diffusion coefficient was carried out on the powder material using EIS test method as follows: an inactivated half-cell, as previously prepared, was left to stand for 2 hours, charged at a constant current of 0.1 C to a cut-off voltage of 4.3 V, then charged for 30 mins at constant voltage, then discharged at a constant current of 0.1 C to a cut-off voltage of 3.0 V, then charged at a constant current of 0.1 C to a cut-off voltage of 4.3 V. The fully charged half-cell was removed and an EIS (Electrochemical Impedance Spectroscopy) test was performed thereon. The frequency was in the range of 100 kHz-0.01 Hz, and the amplitude was 10 mV. According to the following equations $$Z_{re} = R_s + R_{ct} + \sigma\omega^{-1/2}, \text{ and}$$

$$\omega = 2\pi f,$$

the slope of the fitted line of Z'v. $\omega^{-1/2}$, i.e., $\sigma$, can be obtained, where $Z_{re}$ is the real part of the impedance spectroscopy obtained by the test, $R_s$ is the solution resistance, $R_{ct}$ is the charge-transfer resistance, $\omega$ is the angular frequency, f is the test frequency, and $\sigma$ is the Warburg factor.

Then according to the equation for calculating the lithium ion diffusion coefficient:

$$D_{Li}^+ = R^2T^2/(2A^2n^4F^4C^2\sigma^2),$$

the $Li^+$ diffusion coefficient of the material bulk phase is obtained by calculation; wherein R is an ideal gas constant, T is an absolute temperature, A is a cross sectional area of the electrode, n is the number of transferred electrons, F is the Faraday constant, and C is the concentration of lithium ions in the electrode.

The physicochemical parameters of the positive electrode materials of Examples 1-5 and Comparative Examples 1-6 were shown in Table 2.

TABLE 2

Physicochemical Parameters of the Positive Electrode Materials

| | Chemical Formula | $D_S$ | $D_X$ | $N = D_S/D_X$ | PD/TD | Angle of Repose $\alpha$ | lithium diffusion coefficient |
|---|---|---|---|---|---|---|---|
| Example 1 | $Li_{1.03}Ni_{0.828}Co_{0.110}Mn_{0.060}W_{0.002}O_2$ | 530 | 41.7 | 12.7 | 1.21 | 36.2 | $7.9 \times 10^{-11}$ |
| Example 2 | $Li_{1.03}Ni_{0.798}Co_{0.100}Mn_{0.100}Nb_{0.002}O_2$ | 570 | 40.3 | 14.1 | 1.26 | 34.3 | $7.2 \times 10^{-11}$ |
| Example 3 | $Li_{1.03}Ni_{0.858}Co_{0.090}Mn_{0.050}Mo_{0.002}O_2$ | 510 | 41.1 | 12.4 | 1.23 | 38.7 | $8.3 \times 10^{-11}$ |
| Example 4 | $Li_{1.03}Ni_{0.895}Co_{0.050}Mn_{0.050}La_{0.002}Al_{0.003}O_2$ | 490 | 41.9 | 11.7 | 1.2 | 39.4 | $7.6 \times 10^{-11}$ |
| Example 5 | $Li_{1.03}Ni_{0.928}Co_{0.040}Mn_{0.030}Ta_{0.002}O_{1.997}F_{0.003}$ | 450 | 41.3 | 10.9 | 1.17 | 40.6 | $7.5 \times 10^{-11}$ |
| Comparative Example 1* | $Li_{1.03}Ni_{0.814}Co_{0.108}Mn_{0.059}W_{0.02}O_2$ | 570 | 36.1 | 15.9 | 1.18 | 41.2 | $6.8 \times 10^{-11}$ |
| Comparative Example 2 | $Li_{1.03}Ni_{0.830}Co_{0.110}Mn_{0.060}O_2$ | 450 | 47.7 | 9.5 | 1.23 | 39.8 | $4.9 \times 10^{-11}$ |
| Comparative Example 3 | $Li_{1.03}Ni_{0.828}Co_{0.110}Mn_{0.060}W_{0.002}O_2$ | 600 | 39.4 | 15.1 | 1.12 | 45.5 | $6.3 \times 10^{-11}$ |
| Comparative Example 4 | $Li_{1.03}Ni_{0.828}Co_{0.110}Mn_{0.060}W_{0.002}O_2$ | 430 | 43.1 | 9.9 | 1.22 | 42.3 | $4.1 \times 10^{-11}$ |
| Comparative Example 5 | $Li_{1.03}Ni_{0.828}Co_{0.110}Mn_{0.060}W_{0.002}O_2$ | 540 | 35.1 | 15.3 | 1.07 | 53.6 | $9.2 \times 10^{-12}$ |
| Comparative Example 6 | $Li_{1.03}Ni_{0.828}Co_{0.110}Mn_{0.060}W_{0.002}O_2$ | 500 | 51.2 | 9.8 | 1.32 | 51.1 | $4.8 \times 10^{-11}$ |

Note*:

In Comparative Example 1, 2 mol % W was introduced, and the molar ratios of Ni, Co and Mn decreased correspondingly. Taking Ni as an example, after 2 mol % W was introduced, the proportion of Ni in the molecular formula decreased to 0.83/(1 + 0.02) = 0.814.

It can be seen from Table 1 and Table 2 that in Examples 1-5 according to the present invention, by adjusting the pH of the reaction system during the growth of the precursor crystal, selecting the types and the amounts of doped elements that have the function of regulating the growth of crystallite boundaries, and adjusting the sintering temperature, the obtained positive electrode materials had a crystallite boundary number N in the range of from 10.5 to 14.5 and an excellent lithium diffusion coefficient.

In Comparative Example 1, when the amount of additive elements that have the effect of regulating the growth of crystallite boundaries was excessive, the size of the crystallites significantly decreased since their growth and fusion were hindered. The number of internal crystallite boundaries was too large, the overall crystallinity of the positive electrode material deteriorated, and the lithium diffusion coefficient decreased.

In Comparative Example 2, when no additive elements that have the effect of regulating the growth of crystallite boundaries was added, it is conducive to the fusion and growth of crystallites so as to eliminate crystallite boundaries, so that the number of crystallite boundaries was too small, and the lithium diffusion coefficient significantly decreased.

In Comparative Example 3, when the pH in the second stage during the precursor synthesis was too high, the crystallinity of the precursor deteriorated, the primary particles of the positive electrode material grew more easily during the sintering process, and relative change of the crystallite size was not large, so that the internal crystallite boundaries increased. The poor crystallinity of the precursor affected the positive electrode material, resulted in a decrease in the lithium diffusion coefficient.

In Comparative Example 4, when the pH of the second stage during the precursor synthesis is lower than that of the first stage, the crystallinity of the precursor became better, the primary particles of the positive electrode material were not easy to grow and their size was relatively small during the sintering process. The relative change of the crystallite size was not large. As a result, the internal crystallite boundaries decreased, and the lithium diffusion coefficient became significantly smaller.

In Comparative Example 5, when the sintering temperature was too low, the fusion and growth among crystallites in the positive electrode material was insufficient, the size was significantly smaller and the crystallite boundaries increased. However, the overall crystallinity of the positive electrode material was poor, and the lithium diffusion coefficient greatly decreased.

In Comparative Example 6, the sintering temperature was too high, the fusion and growth between crystallites in the positive electrode material were excessive, the size was apparently larger, the crystallite boundaries decreased, and the lithium diffusion coefficient decreased.

Table 3 shows the performance parameters of the positive electrode materials of the above Examples 1-5 and Comparative Examples 1-6.

TABLE 3

Performance Parameters of Positive Electrode Materials

|  | Capacity @0.1 C | rate retention rate@ 2 C/0.1 C | 80 cycle retention rate |
|---|---|---|---|
| Example1 | 211.2 | 91.3% | 88.4% |
| Example2 | 209.7 | 91.4% | 88.5% |
| Example3 | 215.5 | 91.6% | 88.2% |
| Example4 | 221.3 | 91.1% | 87.9% |
| Example5 | 225.8 | 91.2% | 87.5% |
| Comparative Example1 | 208.3 | 89.2% | 78.6% |
| Comparative Example2 | 209.6 | 86.7% | 84.6% |
| Comparative Example3 | 209.9 | 88.9% | 79.3% |
| Comparative Example4 | 209.2 | 86.3% | 83.8% |
| Comparative Example5 | 196.7 | 79.5% | 72.1% |
| Comparative Example6 | 207.9 | 84.5% | 83.7% |

It can be seen from the above Table 3 that the positive electrode materials according to Examples 1-5 of the present invention exhibited excellent capacities, rate retention rates and cycle retention rates.

Compared with Example 1, the capacities of the positive electrode materials in Comparative Examples 1-6 at 0.1 C generally decreased. Since the sintering temperature was too low in Comparative Example 5, the growth and crystallization of the positive electrode materials was insufficient, and the capacity could not be developed. Meanwhile, it can be seen that, when the number of crystallite boundaries in the positive electrode material was too high, the rate retention rate decreased, and the cycle retention rate became significantly worse. The main reason is that there were too many crystallite boundaries in the primary particles, which were prone to breakage during cycling. When the number of crystallite boundaries N was small, the rate performance became significantly worse, which is consistent with the above conclusions, which show that controlling the number of crystallite boundaries N of the positive electrode materials within the range of 10.5 to 14.5 is conducive to simultaneously achieving both high rate performance and long cycle life.

What is claimed is:

1. A positive electrode material for a lithium ion battery, having the following general formula I:

$$Li_{1+a}Ni_xCo_yMn_zM_cM'_dO_{2-b}A_b \qquad \text{general formula I,}$$

wherein $-0.05 \leq a \leq 0.3$, $0.8 \leq x \leq 1$, $0 \leq y \leq 0.2$, $0 \leq z \leq 0.2$, $0 \leq c \leq 0.01$, $0 \leq c \leq 0.01$, $0 \leq d \leq 0.01$, $x+y+z+c+d=1$, and $0 \leq b \leq 0.05$;

M and M' are different from each other and each independently selected from at least one of La, Cr, Mo, Ca, Fe, Ti, Zn, Y, Zr, W, Nb, V, Mg, B, Al, Sr, Ba and Ta, A is selected from at least one of F, Cl, Br, I and S, and the number of crystallite boundaries N in primary particles of the positive electrode material is from about 10.5 to about 14.5, wherein N is calculated according to Equation I:

$$N = D_S/D_X \qquad \text{Equation I,}$$

wherein $D_S$ is an average size of the primary particles, as measured from scanning electron microscope (SEM) image of cross section of the positive electrode material, $D_S$ is from about 300 to about 600 nm, and $D_X$ is an average size of crystallites in the primary particles of the positive electrode material, as measured by an XRD test and calculated by the Scherrer equation, $D_X$ is from about 30 to about 60 nm.

2. The positive electrode material according to claim 1, wherein $D_S$ is from about 400 to about 550 nm.

3. The positive electrode material according to claim 1, wherein $D_X$ is calculated according to Equation II:

$$D_X = (D_{(003)} + D_{(104)})/2 \quad \text{Equation II,}$$

wherein $D_{(003)}$ represents a crystal thickness in a direction normal to (003) crystal plane which is represented by a single (003) peak, $D_{(104)}$ represents a crystal thickness in a direction normal to (104) crystal plane which is represented by a single (104) peak, and $D_{(003)}$ and $D_{(104)}$ are each calculated according to the Scherrer Equation:

$$D = K\lambda/((\beta \cdot \cos \theta)) \quad \text{Scherrer Equation,}$$

wherein,

K is the Schaffer constant of 0.89, $\lambda$ is a wavelength of the X-ray and equals to 1.54056 Å, $\beta$ is a full width at half maximum of the diffraction peak $D_{(003)}$ or $D_{(104)}$ in the XRD pattern, and $\theta$ is a Bragg diffraction angle of the diffraction peak $D_{(003)}$ or $D_{(104)}$ in the XRD pattern, $2\theta$ of the (003) peak is in the range of from about 18.5 to about 19.5°, and $2\theta$ of the (104) peak is in the range of from about 44.0 to about 45.0°.

4. The positive electrode material according to claim 1, wherein a median diameter $D_5$ of secondary particles of the positive electrode material is from about 9 to about 20 μm.

5. The positive electrode material according to claim 1, wherein the ratio of a compacted density PD measured at 20 KN to a tap density TD of the positive electrode material satisfies $1.1 \leq PD/TD \leq 1.3$.

6. The positive electrode material according to claim 1, wherein an angle of repose $\alpha$ of the positive electrode material is $\leq 50°$.

7. A method for preparing the positive electrode material according to claim 1, comprising the steps of:

Step i)-1 mixing a first aqueous solution comprising a nickel salt, a cobalt salt and a manganese salt, a second aqueous solution comprising a sodium-containing alkaline compound and/or a potassium-containing alkaline compound, and aqueous ammonia, and adjusting a first pH value of the resultant mixed aqueous solution to from about 9 to about 12, so as to allow a co-precipitation reaction to occur to form crystals;

Step i)-2 when the crystals grow to a median diameter $D_{50}$ of from about 2 to about 5 μm, adjusting a second pH value of the mixed aqueous solution to from about 9 to about 12, wherein the second pH value is greater than the first pH value and the difference therebetween is from about 0.1 to about 1.0, and allowing the crystals to continue to grow to from about 9 to about 20 μm, thereby obtaining a precursor;

Step ii) mixing the precursor, a lithium source and an additive comprising element M, sintering the resultant mixture at a constant temperature of from about 650 to about 900° C. for from about 4 to about 20 hours, subjecting the mixture to naturally cooling and crushing, sieving, and iron-removal, thereby obtaining a first positive electrode material $Li_{1+a}Ni_xCo_yMn_zM_cO_2$, and optionally Step iii) mixing the first positive electrode material $Li_{1+a}Ni_xCo_yMn_zM_cO_2$ and a second additive comprising element M' and/or A, sintering the resultant mixture at a constant temperature of from about 200 to about 700° C. for from about 3 to about 10 hours, thereby obtaining a second positive electrode material $Li_{1+a}Ni_xCo_yMn_zM_cM'_aO_{2-b}A_b$.

8. The method according to claim 7, wherein the first pH value is from about 10.5 to about 11.2, and the second pH value is from about 11.2 to about 11.8.

9. The method according to claim 7, wherein, in Step i)-1, the nickel salt, the cobalt salt and the manganese salt are each independently selected from the group consisting of sulfates, nitrates, acetates, and combination thereof; and/or the sodium-containing alkaline compound and/or the potassium-containing alkaline compound are each independently selected from the group consisting of hydroxides, carbonates, bicarbonates, oxalates of sodium and of potassium, and combination thereof.

10. The method according to claim 7, wherein, in Step ii), the lithium source is selected from the group consisting of lithium carbonate, lithium hydroxide, and combination thereof; and/or the first additive comprising element M is selected from the group consisting of oxides, hydroxides, halides, sulfides, phosphates, borates of element M, and combination thereof.

11. The method according to claim 7, wherein, in Step iii), the second additive comprising element M' is selected from the group consisting of oxides, hydroxides, halides, sulfides, phosphates, borates of element M', and combination thereof.

* * * * *